United States Patent
Breaker

(10) Patent No.: US 8,979,663 B1
(45) Date of Patent: Mar. 17, 2015

(54) PUTTING GREEN FORMED FROM AERATED POLYMERS AND METHODS OF MAKING THE SAME TO SIMULATE A NATURAL GRASS SURFACE

(76) Inventor: John V. Breaker, Golden, CO (US)

(*) Notice: Subject to any disclaimer, the term of this patent is extended or adjusted under 35 U.S.C. 154(b) by 325 days.

(21) Appl. No.: 13/355,933

(22) Filed: Jan. 23, 2012

Related U.S. Application Data

(60) Provisional application No. 61/435,859, filed on Jan. 25, 2011, provisional application No. 61/440,704, filed on Feb. 8, 2011.

(51) Int. Cl.
*A63B 69/36* (2006.01)

(52) U.S. Cl.
USPC ............. 473/171; 473/162; 473/157; 428/17

(58) Field of Classification Search
CPC ............. A63B 67/02; A63B 69/3661; A63B 2067/025; A63B 57/0056; A63B 69/3676; E01C 13/08; E01C 2013/086; Y10S 273/13; Y10S 273/08; D06N 3/0075; D06N 3/004
USPC ............ 473/157–164, 171, 180, 181; 428/17; 472/92
See application file for complete search history.

(56) References Cited

U.S. PATENT DOCUMENTS

| | | | | |
|---|---|---|---|---|
| 1,513,978 A * | 11/1924 | Flynn et al. | | 473/159 |
| 2,515,847 A * | 7/1950 | Winkler | | 428/17 |
| 3,038,726 A * | 6/1962 | Hesidence | | 473/162 |
| 3,565,742 A * | 2/1971 | Stephens et al. | | 428/356 |
| 3,603,594 A * | 9/1971 | Kelley | | 473/159 |
| 3,661,687 A * | 5/1972 | Spinney et al. | | 428/17 |
| 3,673,056 A * | 6/1972 | Nadler | | 428/17 |
| 3,871,661 A * | 3/1975 | Korff | | 473/160 |
| 4,025,678 A * | 5/1977 | Frank | | 428/90 |
| 4,108,440 A * | 8/1978 | Delaplaine | | 473/160 |
| 4,577,867 A * | 3/1986 | Lenhart | | 473/165 |
| 5,390,926 A * | 2/1995 | Hanson et al. | | 473/162 |
| 6,004,219 A * | 12/1999 | Peabody | | 473/157 |
| 6,287,213 B1 * | 9/2001 | Selton | | 473/180 |
| 2009/0186716 A1 * | 7/2009 | Lancia | | 473/157 |
| 2011/0135851 A1 * | 6/2011 | Dozeman et al. | | 428/17 |

* cited by examiner

*Primary Examiner* — Mark Graham
(74) *Attorney, Agent, or Firm* — Perkins Coie LLP

(57) ABSTRACT

A foamed polymer having a top portion with ruptured cells and a bottom portion of non-ruptured cells is provided. The ruptured cells are formed using mechanical or chemical abrasion to form a plurality of fibrous members that simulate a grass-like surface. The abrasion may be accomplished using sanding or solvents that rupture the cells of the top portion.

17 Claims, 6 Drawing Sheets

PUTTING GREEN FORMED FROM AERATED POLYMERS AND METHODS OF MAKING THE SAME TO SIMULATE A NATURAL GRASS SURFACE

CROSS-REFERENCE TO RELATED PATENT APPLICATIONS

The invention claims priority from U.S. Provisional Patent Application No. 61/435,859 entitled "ARTIFICIAL PUTTING GREEN MAT MADE FROM AERATED CELLULAR POLYMERS TOGETHER WITH A CELL ABRADING, TEXTURIZING SURFACE TREATMENT COMBINE TO MAKE A NATURAL GRASS LIKE PUTTING SURFACE WITH A MINIMUM THICKNESS TO ACCOMMODATE DROP-IN HOLE FOR A GOLF BALL" by: John V. Breaker, and filed on Jan. 25, 2011, which Provisional Patent Application is hereby incorporated by reference in its entirety.

The invention further claims priority from U.S. Provisional Patent Application No. 61/440,704 entitled "METHOD FOR CONVERTING THE SURFACE OF CLOSED CELL, POLYETHYLENE AND POLYURETHANE FOAM SHEET MATERIAL FROM ROLL OR PLANK SHAPES INTO A SURFACE WHICH LOOKS, FEELS AND REACTS LIKE A TIGHTLY MOWN NATURAL GRASS LIKE GOLF COURSE PUTTING GREEN SURFACE" by: John V. Breaker, and filed on Feb. 8, 2011, which Provisional Patent Application is hereby incorporated by reference in its entirety.

BACKGROUND

Golf is one of the most popular sporting games played both recreationally and professionally worldwide. There are many aspects and subtleties to the game of golf that require practicing and mastery of various skills and techniques. For example, there is the long game that requires driving, the intermediate game that requires the use of irons, and the short game that generally includes short irons and wedges as well as putting. As they say, drive for show, putt for dough. Thus, improving ones game generally requires significant practice putting. The putting green practice develops mastery of clubs referred to as putters. These are the three primary aspects to the game of golf that both amateurs and professionals seek to become proficient at and master. While the game of golf can be played year round in warm, sunny climates and regions, in climates and regions that experience winter—as well as less than optimum spring and fall weather—golf is generally restricted to the summer season. Even in warmer climates, in some cases it is difficult to regularly get to the golf course. While indoor facilities do exist in some places, most golfing aficionados don't have access to such facilities nor do they necessarily have the time to engage in such outside golf practice. Because putting is the easiest part of the golf game to simulate indoors, it is a simple matter to create makeshift putting greens that consist of nothing more than a cup laid on its side and placed at one end of a carpeted office room or game room. However, carpets and existing artificial putting greens fail to realistically simulate the tightly mown texture and feel of natural grass.

Many of today's conventional artificial surfaces for putting greens lack the flexibility of a natural turf or other desired surface. Any activity or occupation, which requires long periods of standing or moving on foot, is enhanced by a reasonable flexibility of the surface. This reasonable flexibility can add to a person's reasonable endurance and minimize injury. Moreover, conventional artificial surfaces usually lack the flexibility of a grass covered surface. This lack of flexibility and simulation of real grass diminishes the value of the practice and, in certain instances, can cause injury even if the contact with the surface is merely walking or standing.

Additionally, artificial surfaces used in professional sports, which is commonly known as artificial turf, is mounted on a typically rigid surface. Artificial turf, similarly to other artificial surfaces, lacks the resiliency of grass. Moreover, the artificial turf may delaminate.

Consequently, there is a need in the art for improved putting greens.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In certain aspects, the technology of the present disclosure relates to aerated polymers, which are also known as foams or foamed polymers, such as, for example, certain open and closed cell foams. While any number of polymers may be used for the artificial putting green of the present technology, it has been found that aerated polyethylene and polyurethane sheet work well.

To better simulate grass conditions of actual golf greens, the polymer may be provided with a surface texturing. For example, in certain embodiments herein the top portion, or playing surface of the polymer, may be ruptured to form a porous surface. The rupturing may be accomplished by mechanical or chemical abrasion. Rupturing the playing surface may be followed with additional mechanical or chemical abrasion. The subsequent mechanical or chemical abrasion may cause the porous surface to fragment or tear into fibrous surface membranes. The fibrous membranes simulate the grass texture. The mechanical or chemical abrasion includes, but is not limited to, solvents, sanding, grinding, air blasting, or a combination thereof. The rupturing and subsequent abrasion may be a continuous process or broken into multiple steps. Moreover, the rupturing and subsequent abrasion may include the same or different mechanical or chemical techniques.

To simulate different grasses associated with different courses, locations, and climates, the texture of the playing surface may be varied. This can be controlled in certain instances by the selection of particular foams or polymers, with particular regard to the density thereof. In certain aspects, the density may be controllable by controlling the aeration of the polymer. Also, the application of the mechanical abrasion can be altered to provide the simulation of tighter or looser greens, sometimes referred to by golfers as fast or slow greens.

The aerated polymer of the present technology has a sufficient thickness to provide a depression to simulate a cup. While the artificial or simulated putting green does not need to be provided with a cup, the thickness providing a depression or edge similar to a cup facilitates actual playing conditions. Moreover, while foam sheets generally have a uniform thickness, which is usable in the present technology, in certain aspects, the thickness of the foam may be variable over the area of the artificial putting green to simulate the actual playing surfaces of golf courses. In this regard, the present technology provides for simulation of real life greens associated with real life golf courses.

These and other aspects of the present system and method will be apparent after consideration of the Detailed Description and Figures herein.

DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

The technology of the present application will now be described in sufficient detail to enable one of ordinary skill in the art to make and use the technology of the present application without undue experimentation. Without undue experimentation does not mean no experimentation will be used to determine which foams and which surface textures best simulate a particular grass. Moreover, it is anticipated some trial and error will be necessary to determine which combination of foam and surface texturing simulates a Florida golf course as opposed to a Scottish golf course, for example. In any event, the embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense. Moreover, the technology of the present application will be described with reference to particular exemplary embodiments. An exemplary embodiment is one or a single example and other similar examples may be possible. An exemplary embodiment should not be considered as a preferred or superior example unless specifically identified as such or required from the overall context of the present application. Furthermore, several embodiments herein may be provided with one example to illustrate feature or provide further written description or enablement. Having only a single example should not be construed as the only or best feature.

Figure 1A:
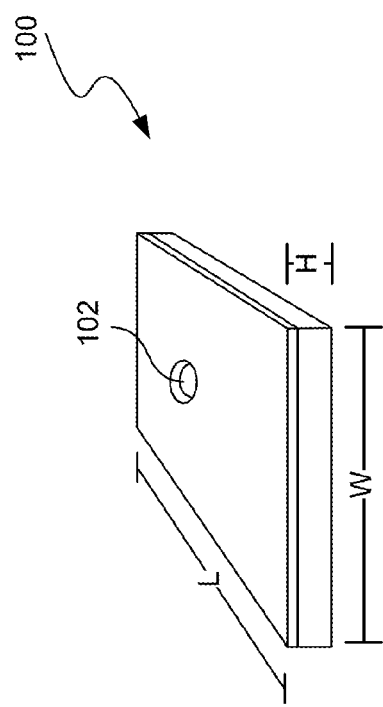
FIGS. 1A-1C depict a top perspective view of artificial surfaces usable to simulate a putting green consistent with the technology of the present application.
Figure 1C:
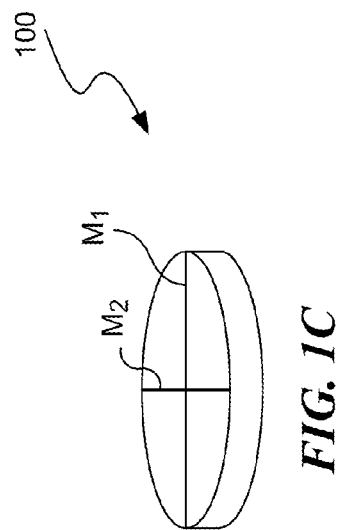
Figure 1B:
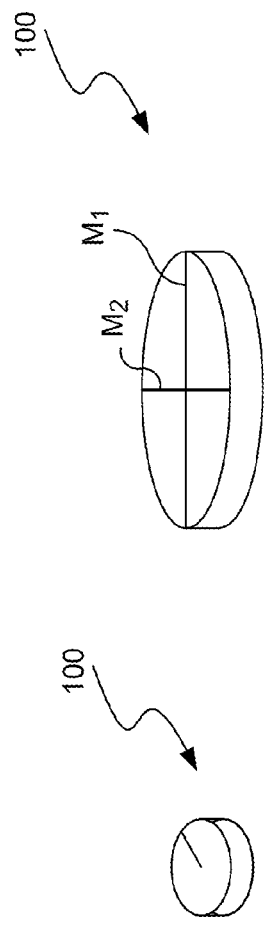

With reference now to FIGS. 1A-1C, an exemplary artificial playing surface 100 is provided. As shown, playing surface 100 is a rectangular mat that is a single homogeneous material that is adapted to lay on a floor, a platform, the ground, or other surfaces. The homogenous material is generally an aerated polymer or a foam. Any number of polymers and foams are possible, but it has been found that foamed polyethylene and polyurethane are satisfactory artificial playing surfaces as the resiliency, hardness, and flexibility is similar to a grass playing surface. The rectangular mat playing surface has a length L, a width W, and a height H. Of course, the artificial playing surface 100 may be circular with a radius r, elliptical with a major axis $m_1$ and a minor axis $m_2$. Of course, artificial playing surface 100 may be any polygonal shape or even a random shape.

With reference to FIG. 1A, the height H of the artificial playing surface 100 is sufficient to allow for a hole 102 in artificial playing surface 100. The hole 102 may be a through hole or a depression in the artificial playing surface 100. While various heights (or thicknesses) are possible, it has been found that the height H being about 1.10-1.25 cm allows a sufficient thickness for the processing, which will be described further below, and the hole 102 simulates a cup in a golf course green. In some embodiments, the height H of the artificial playing surface 100 may be between about 0.5 cm to about 4 cm or more.

Figure 2:
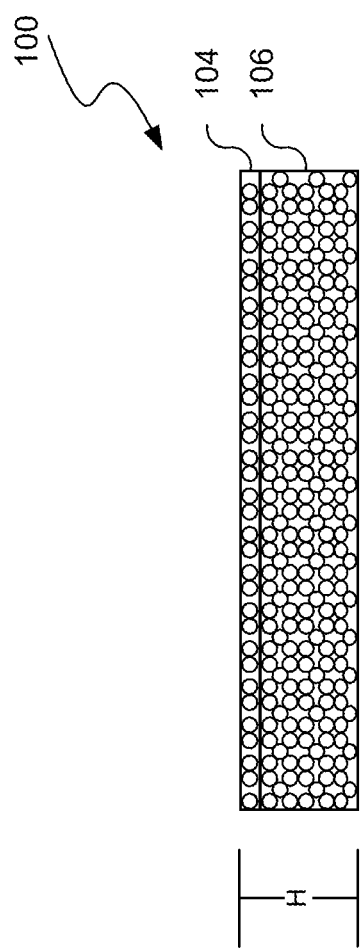
FIG. 2 depicts a cross sectional view of the artificial surface of FIG. 1 consistent with the technology of the present application.
Figure 3:
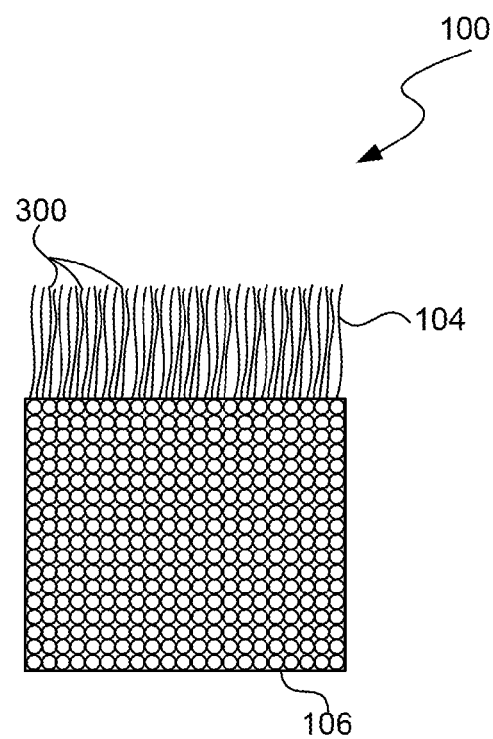
FIG. 3 depicts a cross-sectional view of the artificial surface of FIG. 1 providing additional magnification of the top or playing surface consistent with the technology of the present application.

Artificial playing surface 100 is a homogeneous aerated polymer. As shown in FIG. 2, for example, the artificial playing surface 100 comprises an aerated polymer or foam. The aerated polymer is processed, as will be explained further below, into d top portion 104 arranged on a bottom portion 106. The top portion 104 is formed by rupturing the cells of the foam of the playing side of the artificial playing surface 100 to simulate real grass. As shown in FIG. 3, which is a magnified portion of the cross section of FIG. 2, the foam cells in the top portion 104 of the playing surface 100 are ruptured to form a plurality of fibrous members 300. The fibrous members 300 simulate the real grass of a golf course green. The rupturing of the top portion 104 to form fibrous members, or a nub of grass-like members, causes the artificial playing surface to simulate the speed and roll of the golf ball on the surface.

While described as a homogeneous foam or aerated polymer, playing surface 100 may be layered. Although it is desirable to have the top portion 104 and bottom portion 106 be a homogenous surface such that the playing surface is similar to a real mown grass surface, it is possible to laminate, adhere, fusion weld, or otherwise layer another polymer material beneath playing surface 100 such that top portion 104 and bottom portion 106 may be thinner where the overall playing surface 100 with the second underneath material may be used to provide the overall thickness of the playing surface. If a bottom material is used in conjunction with top portion 104 and bottom portion 106, the thickness of top portion 104 and bottom portion 106 may be as thin as about 0.3 cm.

The grass-like "nub" is created by rupturing the foam on the surface of the artificial playing surface 100. The cell rupturing not only makes the top portion 104 of the artificial playing surface 100 behave like grass, but also look and feel grass like. Texturing the surface of the foam to look like grass can be done with various production methods, and will be explained further below. The surface treatment process may include using abrasive materials as one method of rupturing the cells of the foam to leave a soft hair-like edge around the cell. The rupturing of the cell causes the cell to form a concave shape similar to a crater where the edges of the crater are formed into fibrous members. From a distance, the surface of the foam once ruptured may still look relatively flat and smooth; the foam, however, is porous. The abrasive surface treatment may include mechanical or chemical abrasion. One type of mechanical abrasion includes sanding the surface using a mechanical sander such as, for example, a hand sander or a belt sander. A hand sander may provide for some randomness to the direction and size of the fibrous members to simulate randomness in real greens. A belt sander, with a belt having a width of greater than W, may provide a relatively uniform direction and size of the fibrous members. Chemical abrasion may be accomplished using solvents. Changing the grain of the sander or the solvent may allow for variations in the hardness, thickness, and height of the fibrous members to simulate different types of grasses and cuts.

Figure 4:
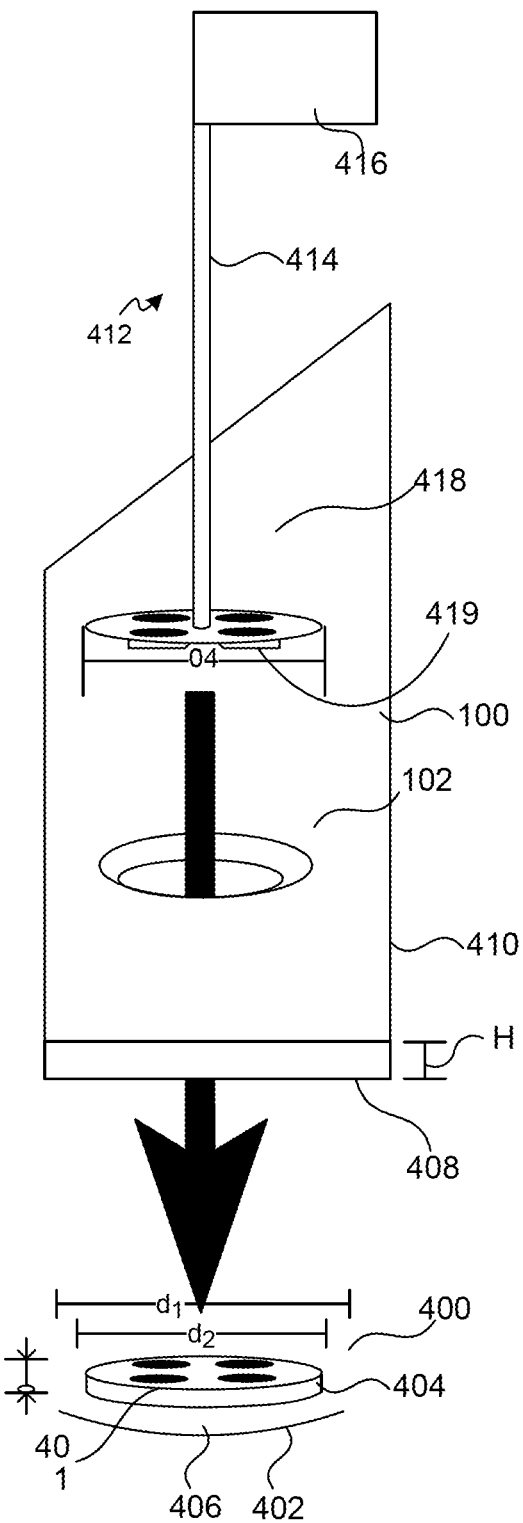
FIG. 4 depicts the artificial surface of FIG. 1 with a cup and an extraction flag that cooperates with the hole of the artificial surface of FIG. 1 consistent with the technology of the present application.

Referring now to FIG. 4, a portion of the artificial playing surface 100 with the hole 102 to simulate a hole of a golf course green is shown in an exploded perspective view. The hole 102 is shown as a through hole in this exemplary embodiment. The hole 102 is fitted with a cup 400. Cup 400 has a base 402 and a raised circular wall 404. The base 402 may have one or more recesses 401. The base 402 has a first diameter $d_1$ and the raised circular wall 404 that extends from the base 402 has a second diameter $d_2$ smaller than $d_1$ such that a portion of base 402 extends beyond raised circular wall 404 to form a flanged surface 406. Second diameter $d_2$ is substantially equal to the diameter of the hole 102 such that the raised circular wall 404 cooperatively engages the hole 102. The raised circular wall 404 extends a distance $d_3$ that is less than the height H. The flanged surface 406 abuts a bottom surface 408 of the bottom portion 106. The flanged surface 406 abutting the bottom surface 408 inhibits the ability of raised circular wall 404 from extending beyond a top surface 410 of the top portion 104.

An extraction flag 412 may be fitted into the cup 400. The flag 412 includes a vertical pole 414 with a top and bottom. The top of the flag includes a flag 416 that may be gripable to allow extraction of the extraction flag 412. The bottom of the vertical hole 414 may include a flag base 418. The flag base 418 is shaped to cooperatively fit within the hole 102 and has a diameter $d_4$. Diameter $d_4$ is substantially equal to diameter $d_2$ such that the flag base 418 fits snuggly within the raised circular wall 404. The flag base 418 may include one or more protrusions 419 that cooperatively engage recesses 401 in the base 402 of cup 400. In one exemplary embodiment, the base 402 has four uniform and equally spaced recesses 401 that cooperatively mate with four uniform and equally spaced protrusions 419 to provide stability to the extraction flag 412 when a ball rolls into the hole 102. The ball may be removed from the hole 102 by gripping the flag 416 and extracting it from the hole 102. The flag base 418 lifts the ball from the hole 102.

Figure 5:
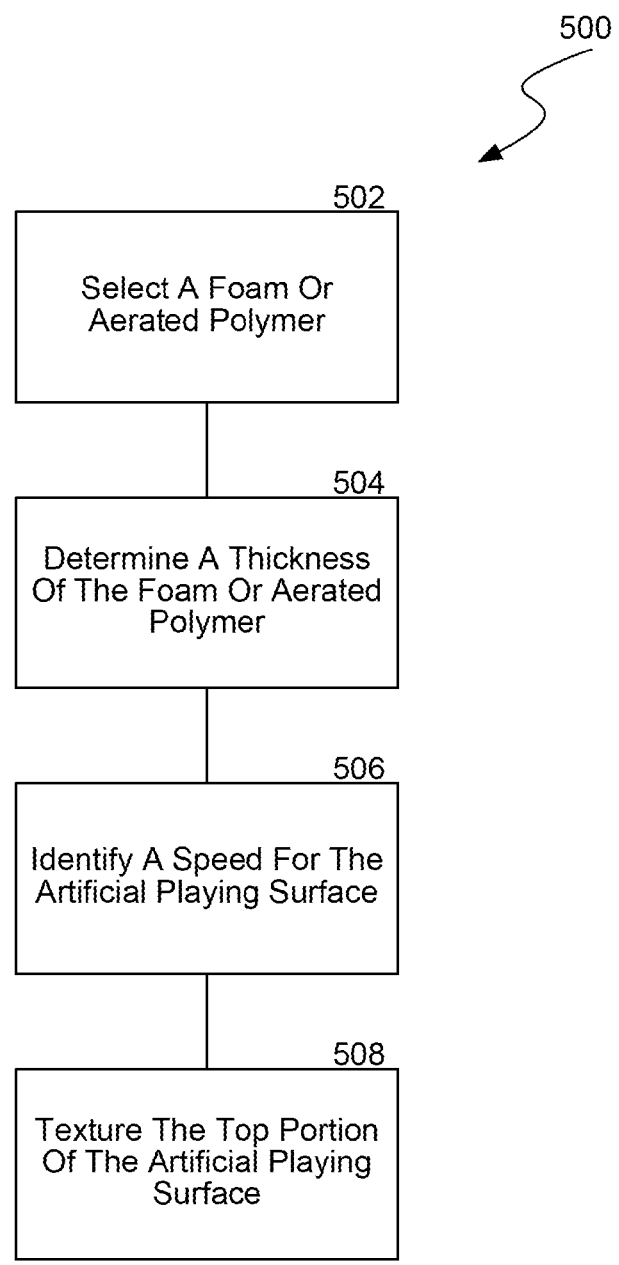
FIG. 5 is illustrative of steps in one methodology of forming the artificial playing surface of FIG. 1 consistent with the technology of the present application.

Referring now to FIG. 5, an exemplary flowchart 500 is provided illustrating one possible methodology for creating an artificial playing surface 100 outlined above. While shown as a series of discrete steps, it should be appreciated that the steps may be performed in an order other than the order described herein. Moreover, the steps are exemplary and some steps may be added or removed as the situation requires. Additionally, some of the steps provided may be consolidated into less steps or split up into more steps. With that in mind, the process begins at step 502 with the selection of a polyethylene or polyurethane foam. As explained above, the polyethylene or polyurethane foam material selected should be able to withstand the compression of walking without making a permanent footprint similar to the mowed grass of a golf course green. Like a putting green, walking on this material should make a footprint, but the footprint should rebound back in a few seconds. The polyethylene or polyurethane foams which work the best are closed cell, with densities of between 0.5 to 5.0 lbs per cubic foot. Foam is measured in pounds per cubic foot in the United States. Higher density foams allow for the smaller maximum size of the nub of grass which can be produced. Selecting between the polyethylene and polyurethane foams is a function of the softness and rebound speed desired. Polyurethane can be made softer and may have a faster rebound of footprints. Polyurethane is less susceptible to compression set or the inability to have a footprint rebound. Once the type of foam is selected, a thickness of the foam is determined at step 504. One advantage of using foam as the homogeneous off-course putting green material is the ability to create a hole for the golf ball to fall into. With woven synthetic materials, padding or an elevation ramp has to be built in order to create enough height for a hole to be deep enough for the golf ball to drop in. The homogeneous foam conversion process allows for depth as an integral part of the putting surface. A thickness of 0.6 cm allows for the conversion of the surface to a grass like surface and have drop-in hole depth as well. This relatively thin 0.6 cm thickness generally is associated with selecting a foam with a relatively low density. After selection of the type of foam or aerated polymer and determination of the thickness of the same, next, one should identify the speed at which you want the putts to roll, step 506. The speed at which the golf ball rolls with the same amount of energy applied to it varies based on the texture of both a natural putting green and with the improved off course putting green described. Once the density and thickness of the polyethylene or polyurethane material is selected, the texture affecting the speed is determined. Putting greens vary in speed from golf course to golf course. It is one of the more challenging things about golf and, specifically, the putting aspect of golf. You might be accustomed to the speed of the greens at one course and then, when you play another course, the speed up or down can be very different. The speeds of putting greens on the PGA tour are fast relative to the speeds of putting greens at municipal golf courses. The speed of a real natural grass putting surface is measured and maintained by an instrument called a stimpmeter. The stimpmeter is a simple ramp device that has a notch. As one end of the stimpmeter is elevated, the golf ball rolls out of the notch and onto the putting surface. The distance the ball rolls, measured in feet, is called the stimp or the speed. The speed of the green is an average of the distance the golf ball rolls in all lour directions. The speed or stimp of a putting green on the PGA tour can be as fast as 14 (rolling an average of 14 lineal feet), a municipal golf course might be as slow as an 8. The fast PGA tour greens might have an actual grass height of 0.25 cm or shorter. The slow municipal green might have grass lengths up to 0.50 cm, or twice the height of the fastest greens. A low density foam, either polyethylene or polyurethane, has more air bubbles trapped in the cross section as well as on its surface. These bubbles are what make the foam a lower density, the more air or more bubbles, the less dense the foam is. The more bubbles, the more surface craters which are exposed during the abrasion process. Each of these craters has an edge or corona. This corona is where the hair-like or grass-like fiber is drawn. The drawing out and creation of a fibrous shape from the corona of the cell crater is accomplished by an abrasive process which includes a variety of grit selections and abrasion motions. Low density materials, with many trapped bubbles, creates more surface craters and a greater number of grass-like nub fibers per square inch. The larger the bubble size and the larger the crater, the longer the length of the fibers created in the etching process. The higher the density of the foam, the fewer air bubbles and, as a result, fewer and short nubs can be created in the etching process. With large bubbles or craters, there also is more space between coronas where fibers can be drawn. Therefore, the speed of the putting green should be considered when considering the foam type and density. Finally, at step 508, the top portion of the artificial playing surface is textured using mechanical or chemical abrasion to rupture the cells and form the fibrous members. The texturing of the top portion includes selecting the grit size and motion of the abrasive used to etch the surface and draw the fiber from the corona and surface polymer of the selected foam material. More and larger bubbles, or cells, is more dense; fewer and smaller bubbles, or cells, is less dense. These cells, which make up the polymer, can be relatively large or small and still be the same density. It is a combination of the size and number of bubbles, along with the physical properties of the polyethylene or polyurethane foam polymer, which determine the density of the foam. When the surface is abraded with an abrasive technique, there are several forms which the abrasive can take and many tools which can apply the motion required to create the desired texture to create the length, configuration, width and quantity of the hair-like and grass-like fiber. All of the elements of the process contribute to the overall functionality of the putting green. Foam density, thickness, abrasive for etching, and the motion of etching are all variables that can be modified to change how the putting green functions. Texturing the top portion may be accomplished using mechanical or chemical abrasion. Mechanical abrasion, for example, may be accomplished by air blasting or sanding the top portion. When sanding the top portion, first the PV of the grit selected to convert the surface of the putting green foam material is determined. Pressure time velocity is the final component of creating the texture of the putting green. The pressure is the amount of force applied to the grit for abrasion and the velocity is the speed at which the grit is running on the surface of the material. There are hundreds of combinations of pressure and velocity. The abrasive can be very lightly applied with a handheld device and a very high abrasive speed or, conversely, a very high pressure, or force, applied with a slow abrasive speed. There are hundreds of combinations in between these two extremes, each creating a different texture and fiber configuration. The specific combination includes the determination of whether the artificial playing surface should simulate a lean of real grass. Thus, one should select the direction for the created fibrous members should lean. The fibrous members may lean all one direction, multi-directional or random. This is a function of the abrasion device chosen and the motion of the abrasive device. Some types of mechanical abrasion may be accomplished by sanding machines, belt sanders, drum sanders, orbital sanders, handheld sanders, rotary sanders all either large or small formats. This process of rupturing the surfaces may be applied to floor mats for yoga or physical education as well as cushioning matters for dog and cat beds and litter boxes. The technology may be used for other surfaces including, for example, a beach mat, baby diaper changing surface, automobile seat cushions. Natural grass grows in random patterns; there is not a repeated exact order for the orientation of the blade of grass. Mowing creates a grain; sometimes in one direction and sometimes the mower creates back and forth grain. Combining this randomness with the extreme mowing or cutting height makes woven synthetic grass with its relatively long fiber blade not at all like real putting green grass. The grass on a putting green is mown to a very short height often less than ⅛" (0.125"); in fact, the demand for faster greens has golf course greens keepers mowing greens to 0.100". The grass on real grass putting greens is not a "blade" of grass but rather a "nub" of grass. Therefore, what we are really trying to replicate is random nubs of grass. These random nubs of grass grow in a spongy environment where other nubs of grass get cut and pile up. Ideally, an off-course putting green material would have random nubs of grass on a spongy substrate. The process for changing the surface of a relatively inexpensive polyethylene or polyurethane foam into a random pattern, nub like, soft substrate off-course putting green material makes putting off-course for putting practice purposes more authentic and cost effective.

Figure 6:
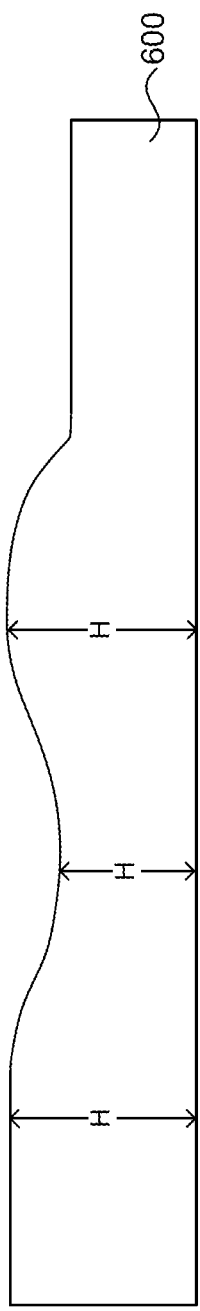
FIG. 6 depicts an alternative playing surface similar to the artificial playing surface of FIG. 1 having a thickness that varies over the length and width of the playing surface to provide simulation of putting green pitch.

Referring now to FIG. 6, an artificial playing surface 600 is shown in an elevation view. Artificial playing surface 600 is similar to artificial playing surface 100 above but does not have a uniform thickness or height H. The variable height H simulates the pitch and roll of a real golf course putting green. It would be possible to form the playing surface during molding into the topography of real golf course greens to simulate real life conditions.

Although the technology has been described in language that is specific to certain structures, materials, and methodological steps, it is to be understood that the invention defined in the appended claims is not necessarily limited to the specific structures, materials, and/or steps described. Rather, the specific aspects and steps are described as forms of implementing the claimed invention. Since many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as Modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. An apparatus to simulate a golf course putting green, comprising:

an artificial playing surface having a height and covering a surface area formed from a homogeneous sheet of a polymer formed of cells, the artificial playing surface comprising:

a top portion comprising cells further having a top surface comprising a plurality of ruptured cells, wherein the plurality of ruptured cells are structurally different than the cells and form a plurality of generally vertical fibrous members simulative of blades of grass;

a bottom portion arranged below the top portion comprising a plurality of cells and adapted to rest on a surface; and a hole formed in at least the top portion having a depth to capture a rolling ball, wherein
the artificial playing surface simulates a golf course green.

2. The apparatus of claim 1, wherein the height of the artificial playing surface varies over the surface area.

3. The apparatus of claim 2, wherein the polymer is molded to form a topography of a golf course green.

4. The apparatus of claim 1, wherein the polymer is a foam.

5. The apparatus of claim 1, wherein the polymer is an aerated polymer.

6. The apparatus of claim 5, wherein the polymer is selected from the group of polymers consisting of: polyethylene or polyurethane.

7. The apparatus of claim 4 wherein the cells are closed cells.

8. The apparatus of claim 7, wherein the foam has a density between about 1 pound per cubic foot and about 5 pounds per cubic foot.

9. The apparatus of claim 1 further comprising a cup arranged in the hole.

10. The apparatus of claim 9 wherein, the cup comprising a base having a first diameter and a raised circular sidewall having a second diameter smaller than the first diameter such that the base has a flanged surface extending radially from the raised circular sidewall.

11. An apparatus, comprising:
    a foamed polymer having a plurality of cells with a density between about 0.5 pounds per cubic foot and 5 pounds per cubic foot having a top portion and a bottom portion;
    the top portion of the foamed polymer having a plurality of cells ruptured to form a plurality of ruptured cells that are structurally different than the plurality of cells and form a plurality of generally vertical fibers simulative of grass arranged in a pattern on the top portion;
    the bottom portion of the foamed polymer being closed cell and arranged below the top portion; and
    a plurality of holes formed in at least the top portion, each of the plurality of holes having a depth and size to capture a rolling ball.

12. The apparatus of claim 11 wherein the plurality of ruptured cells are formed by mechanical abrasion.

13. The apparatus of claim 11 wherein the foamed polymer is at least 0.6 cm thick.

14. The apparatus of claim 11 wherein the plurality of cells are closed cells.

15. An apparatus to simulate a golf course putting green, comprising:
    an artificial playing surface having a height and covering a surface area formed from a homogeneous sheet of a polymer formed of a plurality of closed cells, the artificial playing surface comprising:
        a top portion comprising the polymer formed of a plurality of cells, wherein the top portion further comprises a top surface formed over a majority of the surface area by rupturing the plurality of closed cells in the top surface to form a plurality of generally vertical fibrous members simulative of grass;
        a bottom portion arranged below the top portion comprising a plurality of cells and adapted to rest on a surface; and
        a hole formed in at least the top portion having a depth to capture a rolling ball, wherein
    the plurality of fibrous members formed by the plurality of ruptured cells creates a texture for the artificial playing surface that simulates a golf course green.

16. The apparatus of claim 15, wherein the height of the artificial playing surface varies over the surface area.

17. The apparatus of claim 16, wherein the polymer is molded to form a topography of a golf course green.

* * * * *